United States Patent
Kim et al.

(10) Patent No.: US 7,970,067 B1
(45) Date of Patent: Jun. 28, 2011

(54) OFDM RECEIVER AND METHOD FOR ENHANCING CHANNEL ESTIMATION PERFORMANCE IN COMMUNICATION ENVIRONMENT WHERE HIGH DOPPLER FREQUENCY EXISTS

(75) Inventors: Tae Sung Kim, Suwon-si (KR); Sergey Zhidkov, Suwon-si (KR); Dong Hyun Kang, Yongin-si (KR); Kyu Man Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 847 days.

(21) Appl. No.: 11/980,342

(22) Filed: Oct. 31, 2007

(51) Int. Cl.
*H04K 1/10* (2006.01)

(52) U.S. Cl. ........ 375/260; 375/220; 375/222; 375/267; 370/478; 370/210; 370/465; 370/208; 455/39; 455/77; 455/95

(58) Field of Classification Search ................. 375/267, 375/260, 220, 222; 370/210, 478, 462, 208; 455/77, 39, 95
See application file for complete search history.

(56) References Cited

U.S. PATENT DOCUMENTS

| | | | |
|---|---|---|---|
| 6,393,051 B1 * | 5/2002 | Koizumi et al. | 375/220 |
| 7,613,245 B2 * | 11/2009 | Cho et al. | 375/260 |
| 7,778,337 B2 * | 8/2010 | Tong et al. | 375/260 |
| 2003/0218973 A1 * | 11/2003 | Oprea et al. | 370/210 |
| 2004/0001427 A1 | 1/2004 | Belotserkovsky et al. | |
| 2005/0122998 A1 | 6/2005 | Kamerman et al. | |
| 2007/0298728 A1 * | 12/2007 | Imamura et al. | 455/77 |

FOREIGN PATENT DOCUMENTS

KR 1020060071074 A 6/2006

* cited by examiner

*Primary Examiner* — Eva Y Puente
(74) *Attorney, Agent, or Firm* — Harness, Dickey & Pierce, PLC

(57) ABSTRACT

An OFDM (orthogonal frequency division multiplexing) receiver is equalized by dividing each of a plurality of received OFDM symbols into a plurality of sub-symbols and outputting each of Fourier-converted signals corresponding to each of the sub-symbols, and estimating a channel response corresponding to each of the divided sub-symbols.

14 Claims, 7 Drawing Sheets

OFDM RECEIVER AND METHOD FOR ENHANCING CHANNEL ESTIMATION PERFORMANCE IN COMMUNICATION ENVIRONMENT WHERE HIGH DOPPLER FREQUENCY EXISTS

BACKGROUND

1. Field

Example embodiments relate to an orthogonal frequency division multiplexing communication apparatus and a communication method thereof, for example, to an OFDM (orthogonal frequency division multiplexing) receiver and a receiving method which may enhance a channel estimation performance in a communication environment where a high Doppler frequency exists.

2. Description of the Related Art

OFDM is an example of a multi-carrier modulation in which a serial input data is converted to a parallel data and transmitted on a plurality of subcarriers. OFDM is a method to obtain higher bandwidth efficiency by maintaining orthogonality between neighboring subcarriers.

However, distortion of a channel due to fading may be generated in an OFDM signal transmitted in a multipath channel. To compensate for the distortion of a channel due to the fading, an equalizer may be provided on a receiver side. For the equalizer to compensate for the channel distortion, channel estimation estimating a plurality of subchannels may be needed.

To estimate and compensate for the channel distortion by the multipath channel, a transmitter side may transmit a pilot signal (a pilot symbol) while the receiver side may estimate a channel status (or a channel response) using the received pilot signal. The pilot signal is a signal that the transmitter side and receiver side already know. An interpolation method may be used as a method of estimating a channel response using the pilot signal.

SUMMARY

Example embodiments provide an OFDM receiver and a receiving method which may enhance a channel estimation performance in a communication environment where a high Doppler frequency exists.

According to example embodiments, a method of equalizing an OFDM (orthogonal frequency division multiplexing) receiver may comprise dividing each of a plurality of received OFDM symbols into a plurality of sub-symbols and outputting each of Fourier-converted signals corresponding to each of the sub-symbols and estimating each channel response corresponding to each of the plurality of the divided sub-symbols based on each of Fourier-converted signals corresponding to each of the divided sub-symbols. The OFDM symbols may include a plurality of pilot symbols and a plurality of data symbols. In the outputting of each of Fourier-converted signals corresponding to each of the sub-symbols, each of the OFDM symbols may be time-divided into a plurality of sub-symbols.

The estimating of a channel response corresponding to each of the divided sub-symbols may comprise combining the Fourier-converted signals corresponding to the sub-symbols of each of the OFDM symbols and estimating channel responses to the pilot symbols based on a result of the combining, and estimating channel responses corresponding to the sub-symbols of each of the pilot symbols based on the estimated channel responses to the pilot symbols.

The method may further comprise estimating a plurality of data channel responses to each of the data symbols based on the estimated channel responses corresponding to the sub-symbols of each of the pilot symbols. The method may further comprise channel-compensating for each of the data symbols based on the estimated data channel responses, and combining results of the channel compensation based on the estimated data channel responses.

According to example embodiments, an OFDM (orthogonal frequency division multiplexing) receiver may comprise a Fourier-conversion block dividing each of a plurality of received OFDM symbols into a plurality of sub-symbols and outputting each of the Fourier-converted signals corresponding to each of the sub-symbols, and a channel estimation block estimating each channel response corresponding to each of the plurality of the divided sub-symbols based on each of Fourier-converted signals corresponding to each of the divided sub-symbols. According to example embodiments, an OFDM (orthogonal frequency division multiplexing) receiver may comprise a Fourier-converter dividing each of a plurality of received OFDM symbols into a first sub-symbol and a second sub-symbol and Fourier-converting each of the first and second sub-symbols, and a channel estimation block estimating a channel response corresponding to each of the first and second sub-symbols based on results of the Fourier conversions of the divided first and second sub-symbols.

The OFDM symbols may comprise a plurality of pilot symbols and a plurality of data symbols, and the channel estimation block may estimate channel responses to the pilot symbols based on a result of the combination of the results of the Fourier conversions with respect to the first and second sub-symbols of each of the OFDM symbol and may estimate a channel response to the first sub-symbol and a channel response to the second sub-symbol based on channel responses with respect to the estimated pilot symbols.

The channel estimation block may estimate a first data channel response corresponding to each of the data symbols based on the channel responses to the first sub-symbols of the pilot symbols and estimates a second data channel response corresponding to each of the data symbols based on the channel responses to the second sub-symbols of the pilot symbols The OFDM receiver may further comprise a channel compensation block compensating each of the data symbols based on the estimated first and second data channel responses and combining results of the compensation.

BRIEF DESCRIPTION OF THE DRAWINGS

Example embodiments will become more apparent by describing in detail thereof with reference to the attached drawings in which.

DETAILED DESCRIPTION OF EXAMPLE

Example embodiments will be more clearly understood from the detailed description taken in conjunction with the accompanying drawings.

Various example embodiments will now be described more fully with reference to the accompanying drawings in which some example embodiments are shown. In the drawings, the thicknesses of layers and regions may be exaggerated for clarity.

Detailed illustrative embodiments are disclosed herein. However, specific structural and functional details disclosed herein are merely representative for purposes of describing example embodiments. Examples may, however, may be embodied in many alternate forms and should not be construed as limited to only example embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing example embodiments only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Also, the use of the words "compound," "compounds," or "compound(s)," refer to either a single compound or to a plurality of compounds. These words are used to denote one or more compounds but may also just indicate a single compound.

Now, in order to more specifically describe example embodiments, various embodiments will be described in detail with reference to the attached drawings. However, the present invention is not limited to the example embodiments, but may be embodied in various forms. In the figures, if a layer is formed on another layer or a substrate, it means that the layer is directly formed on another layer or a substrate, or that a third layer is interposed therebetween. In the following description, the same reference numerals denote the same elements.

Although the example embodiments have been disclosed for illustrative purposes, those skilled in the art will appreciate that various modifications, additions and substitutions are possible, without departing from the scope and spirit of example embodiments as disclosed in the accompanying claims.

Figure 1:
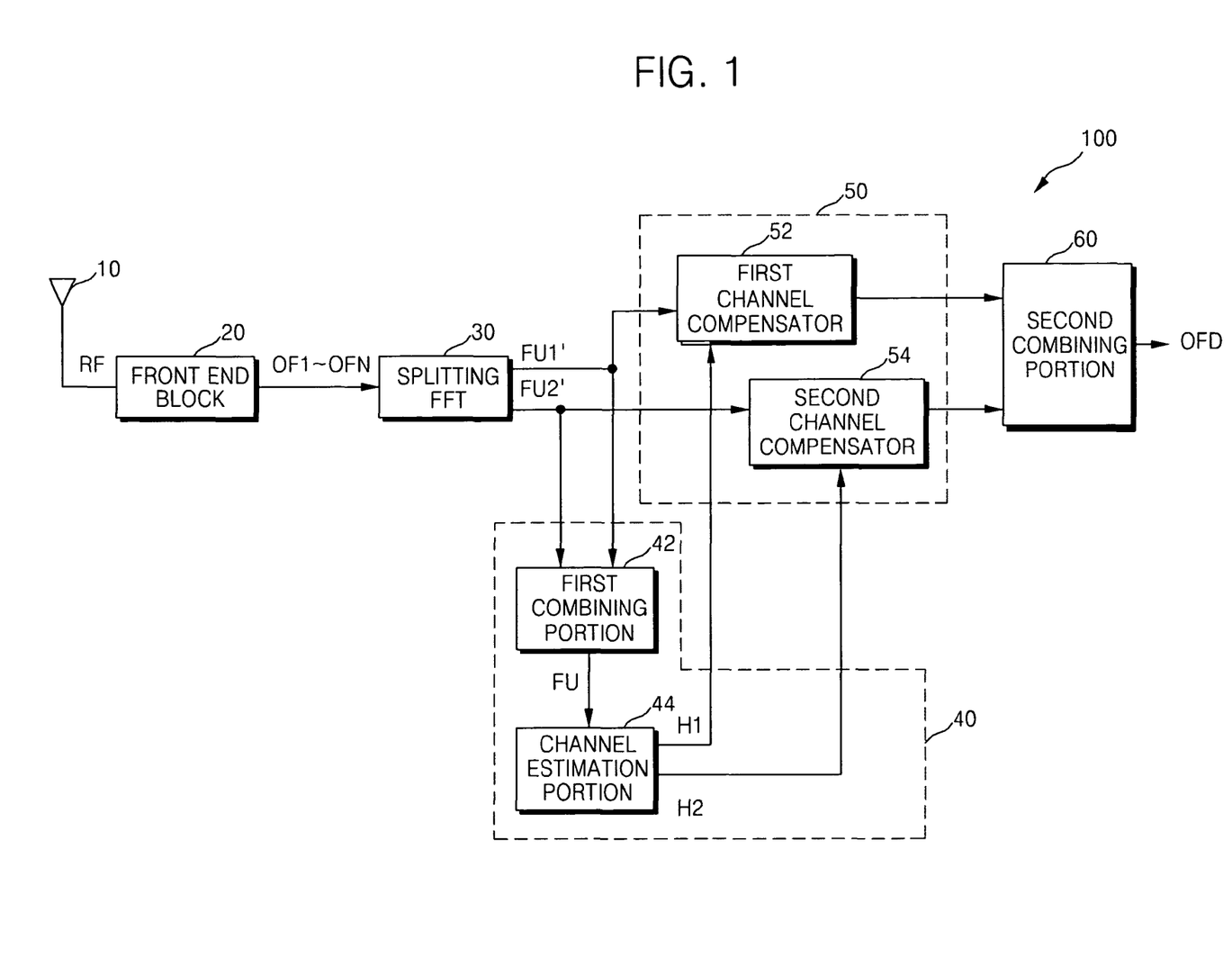
FIG. 1 is a block diagram showing the structure of an OFDM receiver according to example embodiments.

FIG. 1 is a block diagram showing the structure of an OFDM receiver 100 according to example embodiments. Referring to FIG. 1, the OFDM receiver 100 may include an antenna 10, a front end block 20, a splitting fast fourier transformer (FFT) 30, a channel estimation block 40, and/or a channel compensation block 50.

The front end block 20 may receive a radio frequency (RF) signal modulated in an OFDM method, through the antenna 10. The front end block 20 may include a tuner (not shown) and an analog-digital converter (not shown). The front end block 20 may convert the RF signal received through the antenna 10 to a signal having a baseband frequency and an analog signal having a baseband frequency to a digital signal, that is, OFDM symbols OF1-OFN where "N" is a natural number.

The splitting FFT 30 may split each of the OFDM symbols OF1-OFN output from the front end block 20 into a plurality of sub-symbols that are time-divided in multiple times and Fourier-converts each of the sub-symbols. For example, the splitting FFT 30 may split each of the OFDM symbols OF1-OFN into a first sub-symbol and a second sub-symbol and Fourier-converts each of the first and second sub-symbols.

Figure 2:
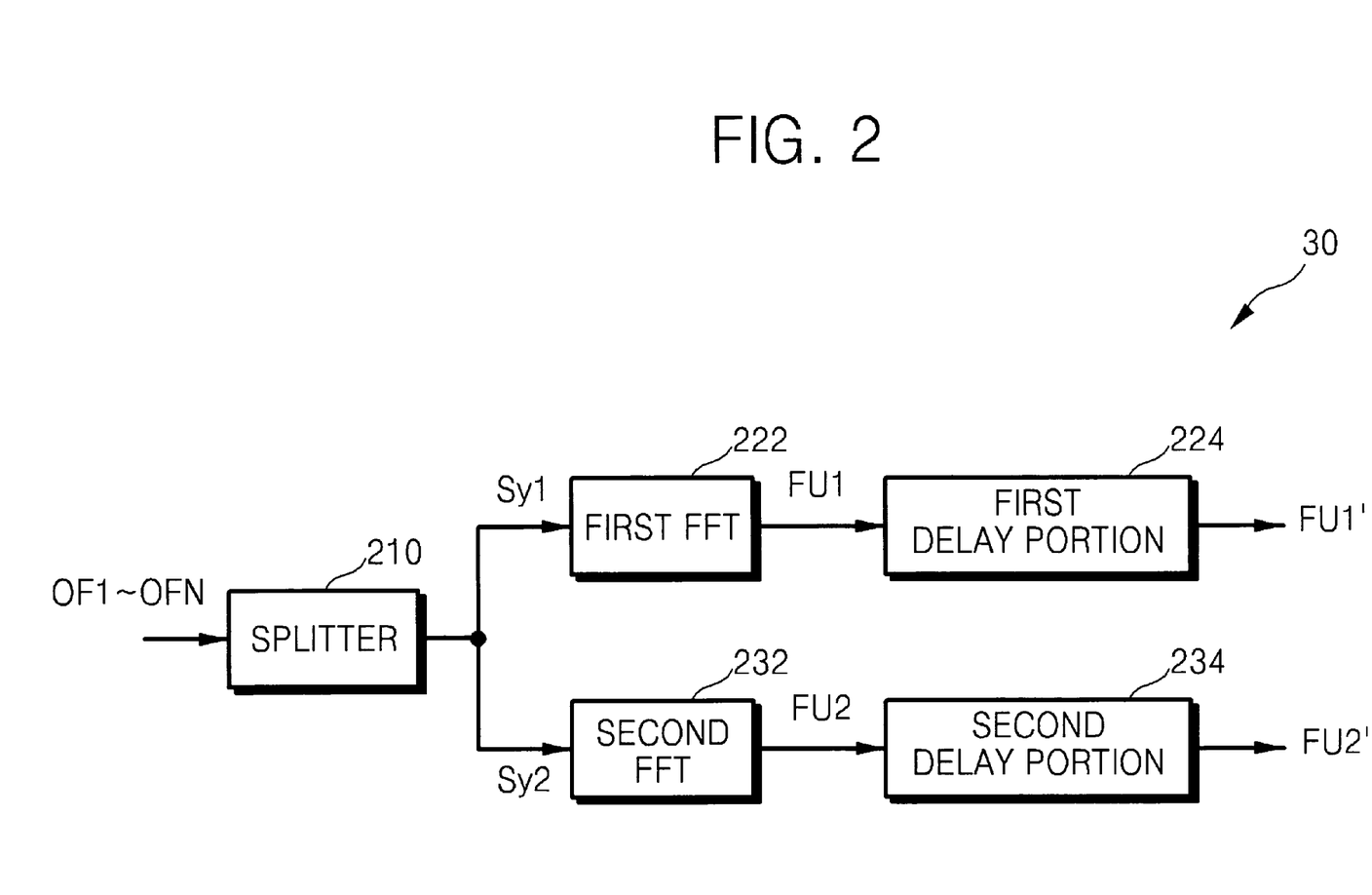
FIG. 2 is an example block diagram of the splitting FFT of FIG. 1.

FIG. 2 illustrates the structure of the splitting FFT 30 of FIG. 1. Referring to FIG. 2, the splitter FFT 30 may include a splitter 210, a first FFT 222, a first delay portion 224, a second FFT 232, and a second delay portion 234. The splitter 210 outputs a first sub-symbol Sy1 of the OFDM symbol OFN, for example, N=1, to the first FFT 222 and a second sub-symbol Sy2 of the OFDM symbol OF1 to the second FFT 232. The first sub-symbol Sy1 and the second sub-symbol Sy2 may be obtained by time-dividing the unit OFDM symbol OF1 into two parts. Thus, the symbol length of each of the OFDM symbols OF1-OFN may be reduced to half by the splitter 210.

To time-divide the unit OFDM symbol OFN, for example, N=1, into two parts, the splitter 210 may be embodied as a switch that is switched to the first FFT 222 and the second FFT 232 at a predetermined or defined period, for example, half of the period of the OFDM symbol. The first FFT 222 fast-Fourier-converts the first sub-symbol Sy1 and outputs a first signal FU1 that is fast-Fourier-converted. The first delay portion 224 delays the first signal FU1 for a first time and outputs a delayed first signal FU1'.

The second FFT 232 fast-Fourier-converts the second sub-symbol Sy2 and outputs a second signal FU2 that is fast-Fourier-converted. The second delay portion 234 delays the second signal FU2 for a second time and outputs a delayed second signal FU2'. The first time and the second time may be the same or not.

The delay of the first time and the second time is for synchronization and for combining (FU1' and FU2').

The OFDM symbols OF1-OFN may include a plurality of data symbols, and a plurality of pilot symbols for channel estimation. The pilot symbols are already known to both of an OFDM transmitter and an OFDM receiver for channel estimation. The channel estimation block 40 may estimate a channel response to each of the pilot symbols included in the OFDM symbols based on a result of combining of the delayed first signal FU1' output from the first delay portion 224 and the delayed second signal FU2' output from the second delay portion 234.

The channel estimation block 40 may estimate a first channel response to the first sub-symbol Sy1 of each of the pilot symbols and a second channel response to the sec and sub-symbol Sy2 of each of the pilot symbols based on channel responses estimated to the pilot symbols.

Figure 3:
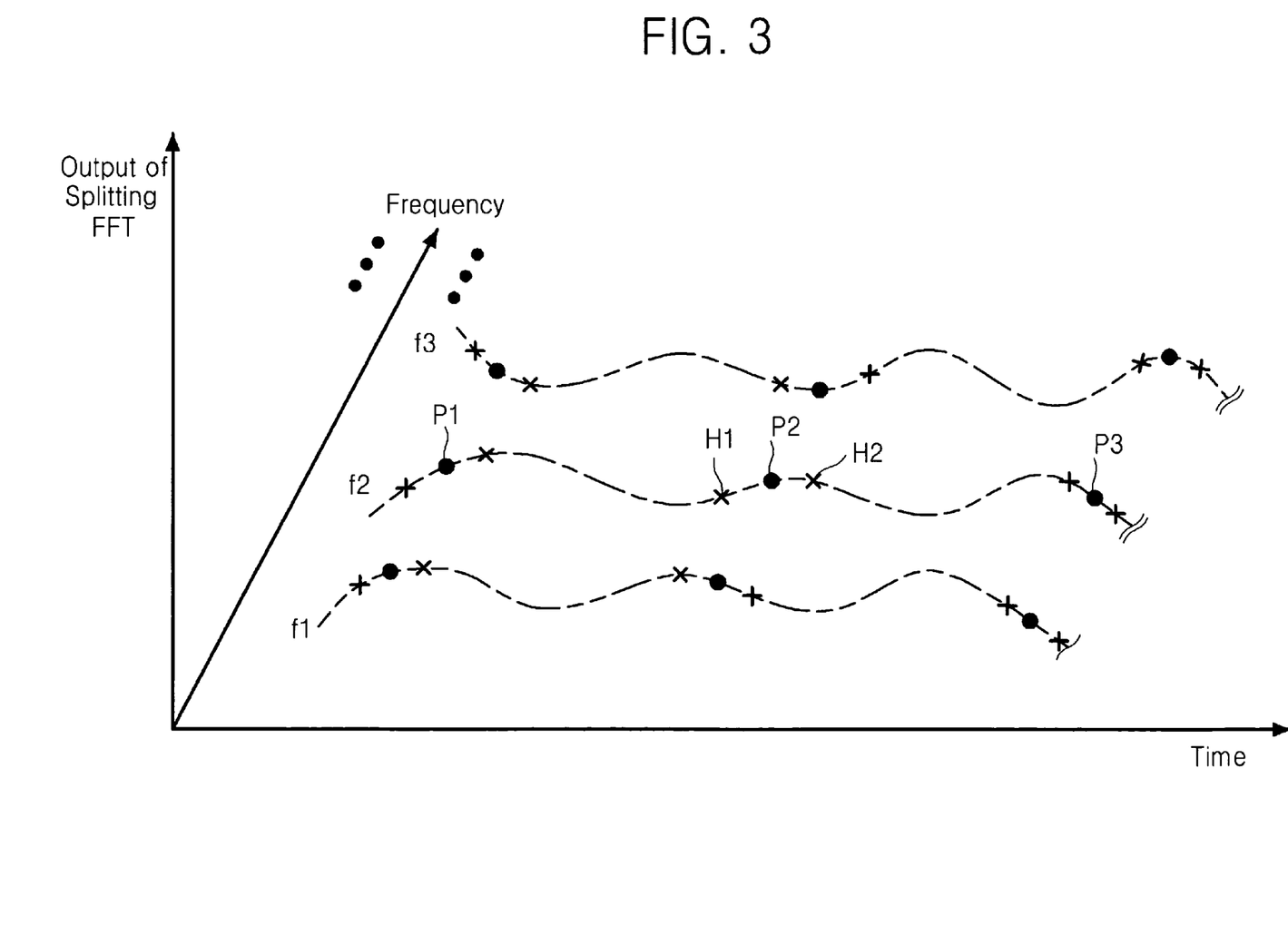
FIG. 3 is an example graph showing the output of the splitting FFT of FIG. 1.

FIG. 3 is an example graph showing the output of the splitting FFT 30 of FIG. 1. Referring to FIG. 3, in the graph, a time axis indicates a result of the Fourier conversion corresponding to each of the OFDM symbols and a frequency axis indicated a result of the Fourier conversion with respect to each of the subchannels included in a single unit OFDM symbol. In FIG. 3, a first identification mark "•" indicates a channel response, for example, P1, P2, and P3, corresponding to each of the pilot symbols and a second identification mark "X" indicates a channel response with respect to the first sub-symbol Sy1 and the second sub-symbol Sy2 of each of the pilot symbols.

Referring to FIG. 1, the channel estimation block 40 may include a first combining portion 42 and a channel estimation portion 44. The first combining portion 42 may combine the Fourier conversion of the first and second sub-symbols Sy1 and Sy2 of each of the pilot symbols. The channel responses, for example, P1, P2, and P3, to the pilot symbols may be estimated based on a result of the combination by the first combining portion 42.

The channel estimation portion 44 may estimate the first channel response to the first sub-symbol Sy1 and the second channel response to the second sub-symbol Sy2 of each of the pilot symbols based on the estimated channel responses, for example, P1, P2, and P3, to the pilot symbols. To estimate the first and second channel responses, a general interpolation method, for example, a linear interpolation, a second interpolation, an interpolation using a low pass filter, or a cubic spline interpolation may be used. The channel estimation portion 44 may estimate each of the data channel responses to each of the data symbols included in the OFDM symbols based on the first channel response to the first sub-symbol Sy1 and the second channel response to the second sub-symbol Sy2 of each of the pilot symbols.

Figure 4:
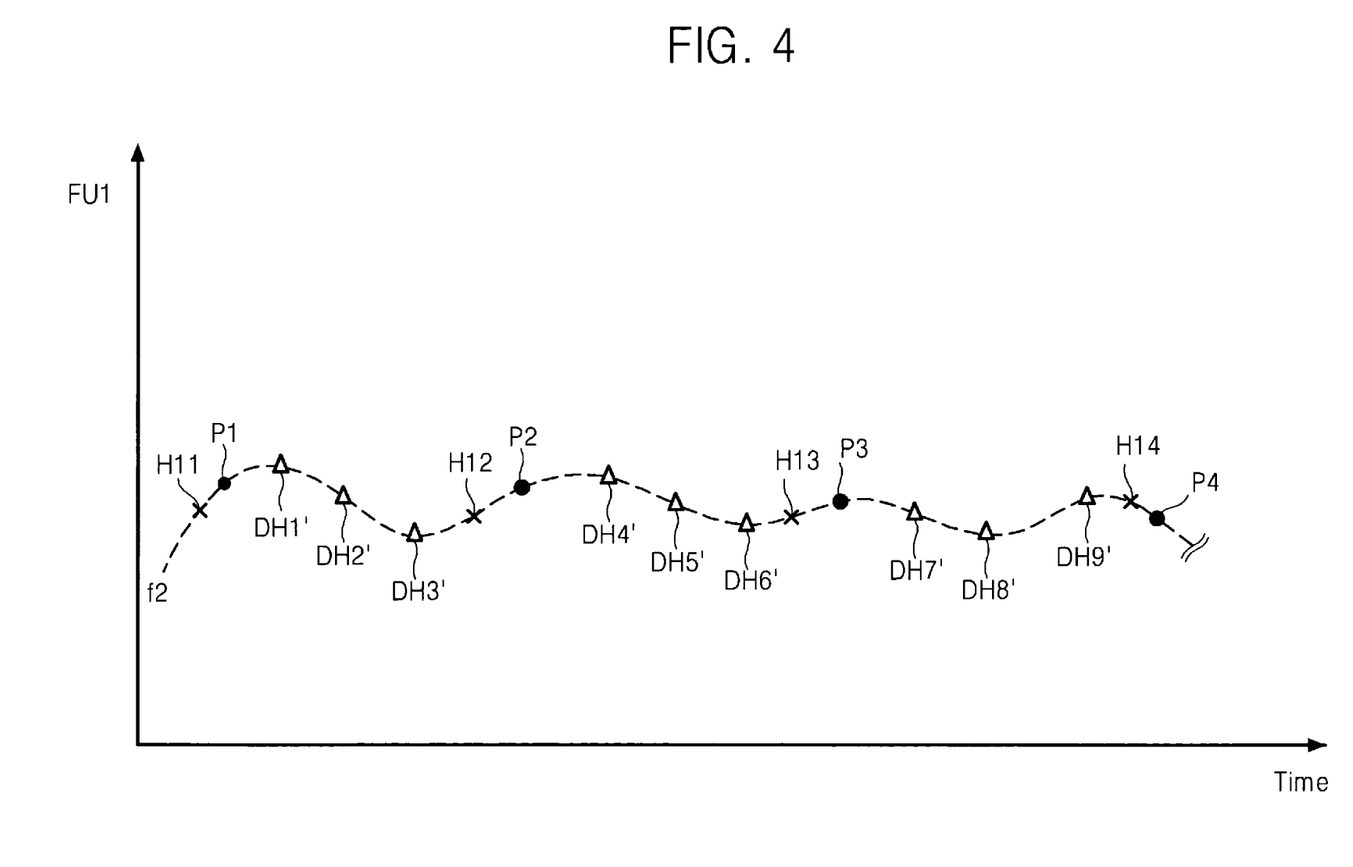
FIG. 4 is an example graph illustrating a method of estimating first data channel responses based on the first channel responses.

FIG. 4 is an example graph illustrating a method of estimating first data channel responses, for example, DH4', DH5', and DH6', based on the first channel responses H11, H12, H13, and H14 at a predetermined or defined frequency f2. The data symbols may be arranged between neighboring pilot symbols of the pilot symbols. The channel estimation portion 44 may estimate the first data channel responses, for example, DH4', DH5', and DH6', with respect to the data symbols using the estimated channel responses, for example, P1, P2, P3, and P4 and the estimated first channel responses H11, H12, H13, and H14, to the pilot symbols.

Figure 5:
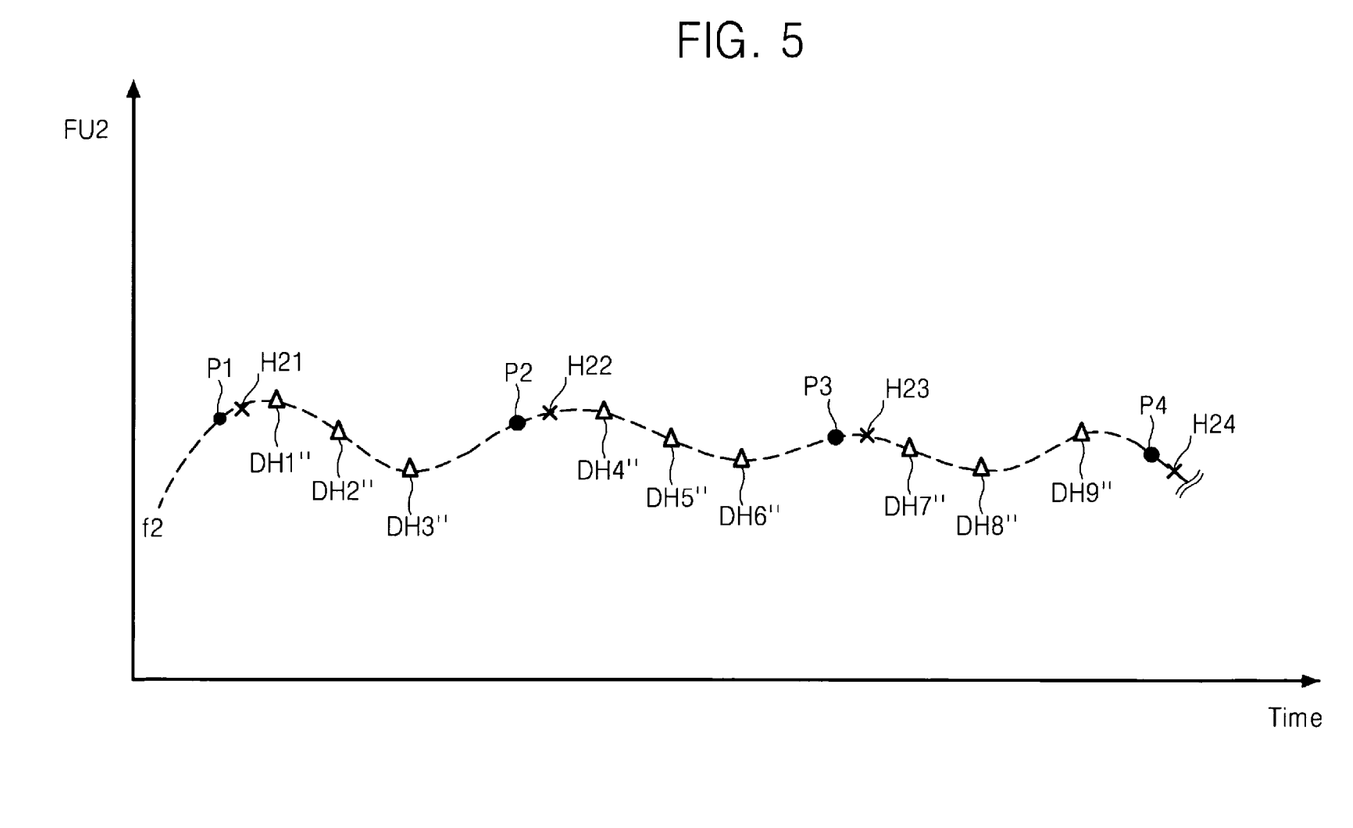
FIG. 5 is an example graph illustrating a method of estimating second data channel responses based on the second channel responses.

In FIG. 1, the first channel responses H11, H12, H13, and H14 and the first data channel responses, for example, DH4', DH5', and DH6', are referred to as H1. FIG. 5 is an example graph illustrating a method of estimating second data channel responses, for example, DH4'', DH5'', and DH6'', based on second channel responses H21, H22, H23, and H24 at the predetermined or defined frequency f2.

Referring to FIG. 5, the channel estimation portion 44 may estimate the second data channel responses, for example, DH4'', DH5'', and DH6'', with respect to the data symbols using the estimated second channel responses, for example, H21, H22, H23, and H24 and the estimated channel responses, for example, P1, P2, P3, and P4, to the pilot symbols. In FIG. 1, the second channel responses, for example, H21, H22, H23, and H24, and the second data channel responses, for example, DH4'', DH5'', and DH6'', are referred to as H2.

To estimate the first data channel responses, for example, DH4', DH5', and DH6' in FIG. 4 and the second data channel responses, for example, DH4'', DH5'', and DH6'' in FIG. 5, a general interpolation method, for example, a linear interpolation, a second interpolation, an interpolation using a low pass filter, or a cubic spline interpolation may be used.

The channel compensation block 50 may compensate for a data symbol corresponding to the data symbols, which may be referred to as the first compensation and may be performed by the first channel compensator 52, based on any corresponding one of the first data channel responses, for example, DH4', DH5', and DH6'. The channel compensation block 50 also may compensate for a data symbol corresponding to the data symbols, which may be referred to as the second compensation and may be performed by the second channel compensator 54, based on any corresponding one of the second data channel responses, for example, DH4'', DH5'', and DH6''. The channel compensation with respect to the date symbol may be complete based on the first and second compensations by the channel compensation block 50. The second combining portion 60 may receive and combine outputs from the first channel compensator 52 and the second channel compensator 54, and output an OFD signal based on the result of combining, as shown in FIG. 1.

In general, inter carrier interference (ICI) power is proportional to the square of the length of the OFDM symbol. Thus, an ICI component may be reduced by decreasing the length of the OFDM symbol. However, because the specification of the length of the OFDM symbol is set, it is impossible to transmit the OFDM symbol with a reduced length to a receiver. Thus, the OFDM receiver 100 according to example embodiments may reduce the length of the received OFDM symbol and perform estimation and compensation of a channel with respect to each of the OFDM symbols with a reduced length so that the ICI is reduced.

For example, in the OFDM communication environment where a high Doppler frequency exists, the amount of a change in a signal received through a channel for a predetermined or defined unit time increases. Thus, as the estimation and compensation of a channel is performed for each of the received OFDM symbols which are time-divided into a plurality of parts, It may be possible to more accurately estimate and compensate the channel.

Figure 6:
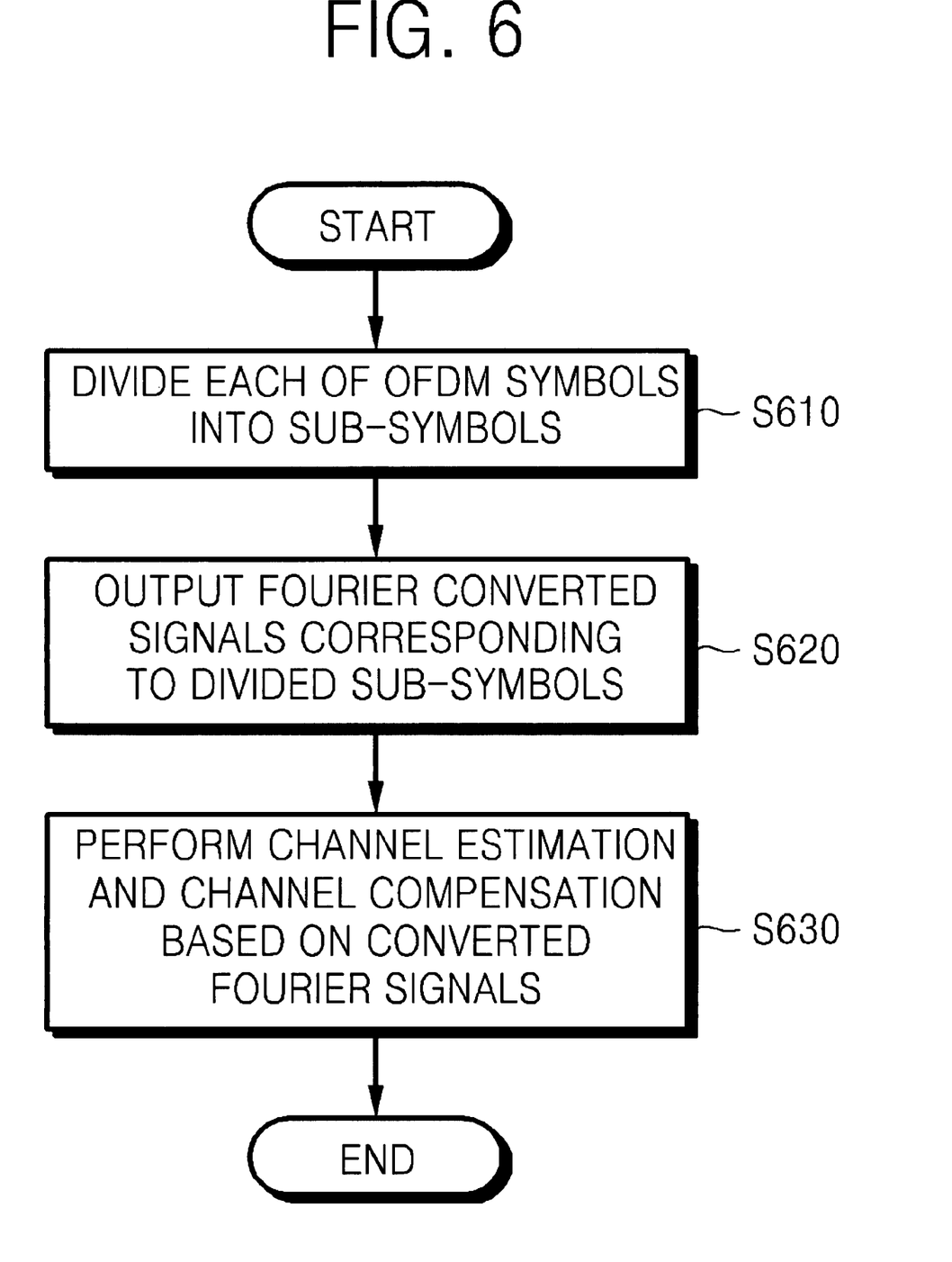
FIG. 6 is a flowchart showing a method of equalizing an OFDM receiver according to example embodiments.

FIG. 6 is a flowchart showing a method of equalizing an OFDM receiver according to example embodiments. Referring to FIGS. 1-6, each of the OFDM symbols OF1-OFN received by the splitting FFT 30 may be divided into a plurality of sub-symbols, for example, sy1 and Sy2 (S610) and the divided sub-symbols, for example, Sy1 and Sy2, are Fourier converted (S620).

Each of the OFDM symbols OF1-OFN may be time-divided into a plurality of sub-symbols. The OFDM symbols OF1-OFN may include a plurality of pilot symbols and a plurality of data symbols. The channel estimation and channel compensation about the data symbols may be performed based on the converted Fourier signals (S630).

Figure 7:
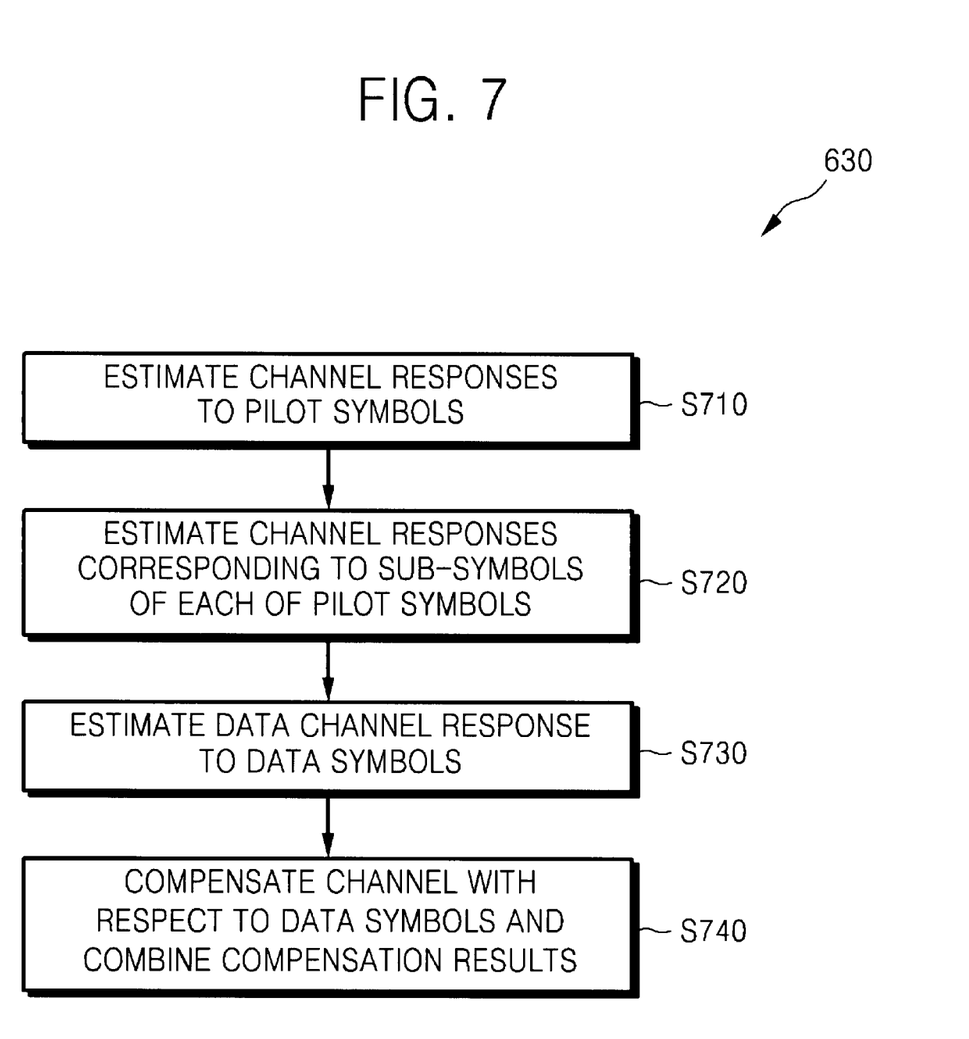
FIG. 7 is an example flowchart showing a method of performing the operation S630 of FIG. 6.

FIG. 7 is an example flowchart showing a method of performing the operation S630 of FIG. 6. Referring to FIG. 7, the channel response corresponding to each of the sub-symbols, for example, Sy1 and Sy2, may be estimated by the channel estimation block 40 based on results of the Fourier conversions corresponding to the divided sub-symbols, for example, Sy1 and Sy2.

The Fourier signals corresponding to each of the sub-symbols, for example, Sy1 and Sy2, of each of the pilot symbols may be combined by the channel estimation block 40. The channel responses to the pilot symbols may be estimated by the channel estimation block 40 based on a result of the combination (S710). The channel responses corresponding to each of the sub-symbols of the pilot symbols may be estimated by the channel estimation block 40 based on the estimated channel responses to the pilot symbols (S720).

The data channel responses to each of the data symbols may be estimated by the channel estimation block 40 based on the estimated channel responses corresponding to the sub-symbols of each of the pilot symbols (S730). Each of the data symbols may be channel-compensated by the channel compensation block 50 based on the estimated data channel responses and a result of the compensation may be combined (S740).

The OFDM receiver and a receiving method according to example embodiments may reduce the ICI by performing the channel estimation and channel compensation by reducing the length of the OFDM symbol received in a communication environment in which a high Doppler frequency exists.

Example embodiments may be implemented, in software, for example, as any suitable computer program. For example, a program in accordance with one or more example embodiments may be a computer program product causing a computer to execute one or more of the example methods described herein.

The computer program product may include a computer-readable medium having computer program logic or code portions embodied thereon for enabling a processor of to perform one or more functions in accordance with one or more example methodology described above. The computer program logic may thus cause the processor to perform one or more of the example methodologies, or one or more functions of a given methodology described herein.

The computer-readable storage medium may be a built-in medium inside a computer main body or removable medium arranged so that it may be separated from a computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for simulating arbitrary software and/or unmodified code directly on a host processor, in accordance with example embodiments.

Further, such programs, when recorded on computer-readable storage media, may be readily stored and distributed. The storage medium, as it is read by a computer, may enable the simulation of arbitrary software and/or unmodified code directly on a host processor, in accordance with the example embodiments.

Example embodiments being thus described, it will be obvious that the same may be varied in many ways. For example, the methods according to example embodiments may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s).

While example embodiments have been particularly shown and described with reference to FIGS. 1-7, it will be understood by those skilled in the art that various changes in form and details may be made therein without departing from the spirit and scope of example embodiments as defined by the appended claims.

What is claimed is:

1. A method of equalizing an OFDM (orthogonal frequency division multiplexing) receiver, the method comprising:
   dividing each of a plurality of received OFDM symbols into a plurality of sub-symbols and outputting Fourier-converted signals corresponding to each of the sub-symbols; and
   estimating each channel response corresponding to each of the plurality of the divided sub-symbols based on each of the Fourier-converted signals corresponding to each of the divided sub-symbols, wherein
   the plurality of OFDM symbols include a plurality of pilot symbols and a plurality of data symbols, and
   estimating the channel response corresponding to each of the divided sub-symbols includes:
      combining the Fourier-converted signals corresponding to the sub-symbols of each of the OFDM symbols and estimating channel responses to the pilot symbols based on a result of the combining.

2. The method of claim 1, wherein, in the outputting of the Fourier-converted signals corresponding to each of the sub-symbols, each of the OFDM symbols is time-divided into a plurality of sub-symbols.

3. The method of claim 1, wherein estimating the channel response corresponding to each of the divided sub-symbols further comprises:
   estimating channel responses corresponding to the sub-symbols of each of the pilot symbols based on the estimated channel responses to the pilot symbols.

4. The method of claim 3, further comprising estimating a plurality of data channel responses to each of the data symbols, based on the estimated channel responses corresponding to the sub-symbols of each of the pilot symbols.

5. The method of claim 4, further comprising channel-compensating for each of the data symbols, based on the estimated data channel responses; and combining results of the channel compensation based on the estimated data channel responses.

6. An OFDM (orthogonal frequency division multiplexing) receiver comprising:

a Fourier-conversion block dividing each of a plurality of received OFDM symbols into a plurality of sub-symbols and outputting Fourier-converted signals corresponding to each of the sub-symbols; and a channel estimation block estimating each channel response corresponding to each of the plurality of the divided sub-symbols based on each of the Fourier-converted signals corresponding to each of the divided sub-symbols, wherein the OFDM symbols include a plurality of pilot symbols and a plurality of data symbols, and the channel estimation block includes:

a first combining portion combining the Fourier-converted signals corresponding to the sub-symbols of each of the OFDM symbols; and a channel estimation portion estimating channel responses to the pilot symbols based on a result of the combination by the first combining portion.

7. The OFDM receiver of claim 6, wherein the Fourier-conversion block comprises:

a splitter time-dividing each of the OFDM symbols into a plurality of sub-symbols; and the Fourier-conversion portion outputting a Fourier-converted signal corresponding to each of the divided sub-symbols.

8. The OFDM receiver of claim 6, wherein the channel estimation block further comprises:

a channel estimation portion estimating channel responses to the pilot symbols based on a result of the combination by the first combining portion and estimating channel responses corresponding to the sub-symbols of each of the pilot symbols based on the estimated channel responses to the pilot symbols.

9. The OFDM receiver of claim 8, wherein the channel estimation portion estimates a plurality of data channel responses to each of the data symbols based on each of the estimated channel responses corresponding to the sub-symbols of each of the pilot symbols.

10. The OFDM receiver of claim 9, further comprising:

a channel compensator performing a channel compensation for each of the data symbols based on each of the estimated data channel responses; and a second combining portion combining results of the channel compensation based on the estimated data symbol channel responses.

11. An OFDM (orthogonal frequency division multiplexing) receiver comprising:

a Fourier-converter dividing each of a plurality of received OFDM symbols into a first sub-symbol and a second sub-symbol and Fourier-converting each of the first and second sub-symbols; and a channel estimation block estimating a channel response corresponding to each of the first and second sub-symbols, based on results of the Fourier conversions of the divided first and second sub-symbols, wherein the OFDM symbols include a plurality of pilot symbols and a plurality of data symbols, and the channel estimation block estimates channel responses to the pilot symbols based on a result of a combination of the results of the Fourier conversions with respect to the first and second sub-symbols of each of the OFDM symbol.

12. The OFDM receiver of claim 11, wherein the channel estimation block further estimates a channel response to the first sub-symbol and a channel response to the second sub-symbol based on channel responses with respect to the estimated pilot symbols.

13. The OFDM receiver of claim 12, wherein the channel estimation block estimates a first data channel response corresponding to each of the data symbols based on the channel responses to the first sub-symbols of the pilot symbols and estimates a second data channel response corresponding to each of the data symbols based on the channel responses to the second sub-symbols of the pilot symbols.

14. The OFDM receiver of claim 13, further comprising a channel compensation block compensating each of the data symbols based on the estimated first and second data channel responses and combining results of the compensation.

\* \* \* \* \*